April 5, 1955 S. H. NORTON 2,705,486
VALVE RETAINER LOCK
Filed April 7, 1951
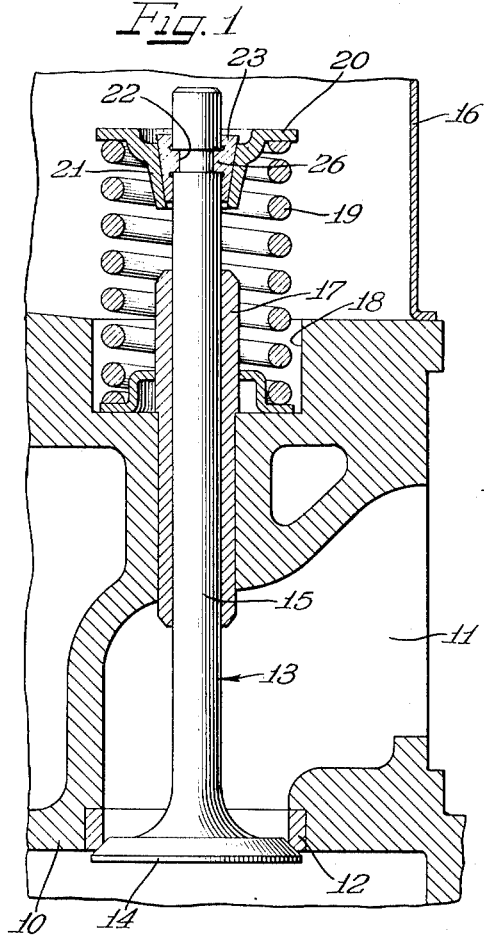
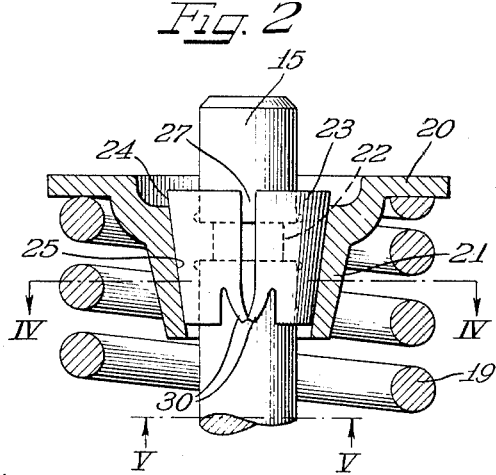
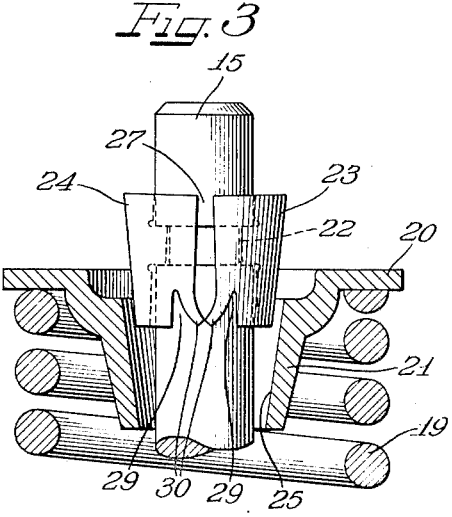
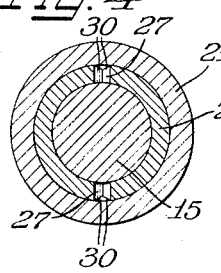
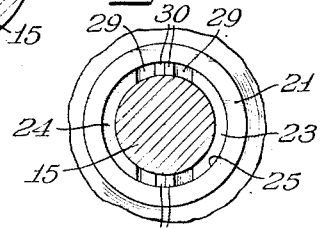
Inventor
Samuel H. Norton
by Hill, Sherman, Meroni, Gross & Simpson
Attys

2,705,486

VALVE RETAINER LOCK

Samuel H. Norton, University Heights, Ohio, assignor to Thompson Products, Inc., Cleveland, Ohio, a corporation of Ohio Application April 7, 1951, Serial No. 219,823

6 Claims. (Cl. 123—188)

This invention relates to lock rings for valves and more particularly to a lock ring for the stem of a valve such as is used in an overhead valve assembly and vehicle engines. In the use of so-called poppet valves in vehicle engines, and particularly in internal combustion engines, it has been observed that due to the presence of excess oil flowing along the stem of the valve toward the head thereof such excess oil will cause the formation of gum and carbonization as well as loss of oil which is detrimental to efficient engine operation. This is particularly true in overhead valve engines where the spring retaining cap about the stem is in a position to collect oil about the upper or free end of the valve stem.

I propose, in accordance with the features of this invention, to provide a lock ring which will cooperate with the spring retaining cap and that the end of the valve stem will restrict substantial flow of oil through the gap of the split lock ring and whereby a small amount of oil will pass through the gap for valve stem lubricating purposes.

An object therefore of this invention is to provide an improved split lock ring for cooperation with the end of a valve stem and which includes means at the gap in the ring for controlling or regulating the flow of oil therethrough and along the valve stem toward the head of the valve.

In accordance with the general features of this invention there is provided in a lock ring structure for a lubricated valve stem having a groove near its extremity for the lock, and a spring retaining cap having a frusto-conical opening defining a wedge surface about and spaced from the grooved end of the stem, a split lock ring engaged in the stem groove and extending into the cap opening with an outer inclined surface for wedging engagement with the cap wedge surface and having a gap extending in the direction of the length of the stem, the ring having inside the opening at the gap prong means for restricting flow of oil through the gap while yet metering a small amount of oil therethrough for valve stem lubricating purposes.

Another feature of the invention relates to forming the oil restricting or regulating means for the gap of the lock ring by notching out the lower edge of the ring to provide cooperating tangs or prongs having their free end in contact in the gap of the ring.

Other objects and features of this invention will more fully appear from the following detailed description taken in connection with the accompanying drawing which illustrates a single embodiment thereof and in which:

Figure 1 is a fragmentary cross sectional view through a portion of an automotive engine having a so-called overhead type valve and which valve is provided with a lock ring embodying the features of this invention;

Figure 2 is an enlarged fragmentary sectional view similar to the upper portion of Figure 1 but showing the lock ring in elevation;

Figure 3 is a fragmentary sectional view similar to Figure 2 but differing from Figure 2 in that the lock ring on the valve stem is shown raised out of the spring retaining cap;

Figure 4 is a cross sectional view taken on the line IV—IV of Figure 2 looking downwardly; and Figure 5 is a fragmentary cross-sectional view taken on substantially the line V—V of Figure 2 looking upwardly and showing the lower end of the lock ring.

As shown on the drawings:

The reference character 10 designates generally an internal combustion engine block having a fluid passage 11 terminating in a valve seat 12. Cooperating with this valve seat 12 is a poppet valve 13 which is of a conventional construction and includes a head 14 engageable on the seat 12. The stem 15 of the valve terminates at its free end in a housing or cover 16 which, as is well known in the engine art, encloses the usual rocker arm mechanisms (not shown) for engaging the upper end of the stem to reciprocate the valve in a predetermined timed cycle.

The stem 15 extends through the usual bearing or liner 17 in the engine block and is reciprocable in this bearing. The block is also recessed in the usual way at 18 to receive the lower end of the compression spring 19 encircling the upper end of the stem 15. In other words the lower end of the spring 19 is seated in the usual way in the recess 18.

The upper end of the spring is retained and cooperates with the so-called retaining cap 20 which has a downwardly depending tubular frusto-conical portion 21 encircling the upper end of the stem. Thus the spring 19 is retained under compression between the cap 20 and the bottom of the recess 18.

The upper end of the stem 15 inside the cap 20 has the usual groove 22 for cooperation with a split lock ring 23 adapted to be wedged in the frusto-conical portion 21 of the cap 20. It is with this lock ring that my present invention is especially concerned.

The lock ring 23 has an outer frusto-conical surface 24 for wedging cooperation with a mating frusto-conical surface 25 in the portion 21 of the cap. In addition, the lock ring has provided on its inner surface an annular rib 26 engageable in the stem groove 22 (Fig. 1).

In this lock ring, as in the conventional ring, a vertical gap 27 is provided (Figs. 2 and 3) through which oil accummulating in the dished upper end of the cap 20 can flow downwardly along the valve stem. Now it has been my observation that due to the size of this gap an excess of oil is permitted to flow along the valve stem and through the liner 17 toward the chamber of the engine. Particularly is this true as the parts wear in the engine. Needless to say the entry of an excess amount of oil into the combustion chamber results in carbonization and sticky valves as well as loss of oil.

I aim therefore, in accordance with the features of this invention, to provide in the lock ring gap 27 means for regulating, controlling or metering the flow of oil therethrough. To this end the lower edge of the ring 23 is provided with notches 29—29 at opposite sides of the gap 27 which result in the forming of prongs or tangs 30—30. These prongs are so bent that their free ends engage or contact each other at or in the gap 27.

The reason a gap 27 of about $\frac{1}{32}$ of an inch is used is because if the edges of the ring were in tight contact before the ring was inserted in the wedge portion 21 of the cap, the ring could not tightly wedge itself between the cap and the stem without extremely accurate fitting and machining operations.

Actually, I contemplate bending the prongs 30 more than enough just to contact with each other so that they will be forced back or bent back when the ring is wedged in the cap. This is possible because the wedging action is much greater than the resistance to springing or bending of the mating prongs. Then, too, this arrangement insures that the mating prongs, when the lock ring is in wedged position, will be held tightly together by the spring action of the metal.

While it is possible, by accurate machining, to so form the spring prongs 30 that they will absolutely seal off the flow of any oil through the gap 27 along the valve stem, actually when they are made according to modern production methods there is sufficient manufacturing imperfections to allow a very slight seepage for metering of oil through the lock ring assembly, which is desirable for valve stem lubricating purposes.

Accordingly, the advantages and features of my invention may be summarized as follows:

1. This improvement in use seals against passage of considerable oil through the valve lock ring and cap.
2. The seal is not 100%, thus allowing a very small quantity of oil to seep through, to oil the valve stem.
3. The sealing prongs are not rigid, but will bend as the lock ring wears or seats itself farther into the cap. If they did not bend, they would hold the lock ring away from the valve stem, thereby destroying the efficiency of the lock. It has been proved that the locking effect by the wedging of the lock ring against the stem is greater than the contact pressure of the prongs in the groove.
4. This improvement can be made without any appreciable alterations of the lock parts.
5. It eliminates the need for other costly means to prevent oil passing through the lock ring.
6. It can be installed, without additional tools or equipment, and will not necessitate change in present valve installation methods.
7. The function of the lock ring is not changed at all, except, for the control of oil seepage.
8. The sealing prongs when made are bent more than is necessary, for them to make contact with each other in use. When they are assembled on the valve with cap, the prongs compress tightly against each other thereby bending until the lock ring seats against the valve stem. This will provide a continuous sealing pressure by one prong against another due to the spring or resistance to bending of the metal in prongs.

It will be understood that modifications and variations may be effected without departing from the scope of the novel concepts of the present invention.

I claim as my invention:

1. In a lock ring structure for a lubricated valve stem having a groove near its extremity for the lock ring, and a spring retaining cap having a frusto-conical opening defining a wedge surface about and spaced from the grooved end of the stem, a split lock ring engaged in said stem groove and extending into said cap opening with an outer inclined surface for wedging engagement with said cap wedge surface and having a gap extending in the direction of the length of the stem, said ring having inside said opening at said gap prong means for restricting flow of oil through the gap while yet metering a small amount of oil therethrough for valve stem lubricating purposes, said prong means comprising at least one resilient prong formed in the lower edge of the ring and separated from said edge by a notch in the edge.

2. In a lock ring structure for a lubricated valve stem having a groove near its extremity for the lock ring, and a spring retaining cap having a frusto-conical opening defining a wedge surface about and spaced from the grooved end of the stem, a split lock ring engaged in said stem groove and extending into said cap opening with an outer inclined surface for wedging engagement with said cap wedge surface and having a gap extending in the direction of the length of the stem, said ring having inside said opening at said gap tangs engaging each other in said gap to seal off the gap against substantial flow of oil therethrough while yet permitting a trickle of oil therethrough for valve stem lubricating purposes, said tangs being opposite each other with their ends in engagement and each being formed in a lower edge of the ring and separated from the edge of the ring by a notch in the edge.

3. For use with a valve having a stem with a lock ring groove near its extremity and located inside of a lock ring opening in a valve spring retaining cap; a split lock ring for disposition around the stem in said cap and in cooperation with said stem groove comprising a split circular member having a vertical gap defined by substantially straight uninterrupted spaced vertical walls disposed between the upper and lower edges of the member and provided with projected means extending into the gap for controlling and metering flow of oil through the gap, said projected means comprising a tapering prong projecting substantially laterally from one of said gap walls and having a free peak end in substantially yieldable point contact with a portion of the other vertical gap wall.

4. For use with a valve having a stem with a lock ring groove near its extremity and located inside of a lock ring opening in a valve spring retaining cap; a split lock ring for disposition around the stem in said cap and engaged in said stem groove comprising a split circular member having a vertical gap disposed between the upper and lower edges of the member and provided with tangs projecting into said gap for contact with each other and for controlling flow of oil through the gap, said tangs being formed in the lower edge of the member and being separated from the edge by notches in the edge on opposite sides of the gap.

5. The split lock ring structure of claim 3 further characterized by said prong being notched for rendering it transversely yieldable.

6. The split lock ring structure of claim 3 further characterized by said prong being formed resilient for movement transversely of said gap and relative to said gap walls.

References Cited in the file of this patent

UNITED STATES PATENTS

| | | |
|---|---|---|
| 1,554,227 | Nickol | Sept. 22, 1925 |
| 2,419,708 | Cummings | Apr. 29, 1947 |